Feb. 15, 1966     E. R. POWELL     3,235,351
APPARATUS FOR MAKING FOAMED CERAMIC PRODUCTS
Original Filed April 7, 1959
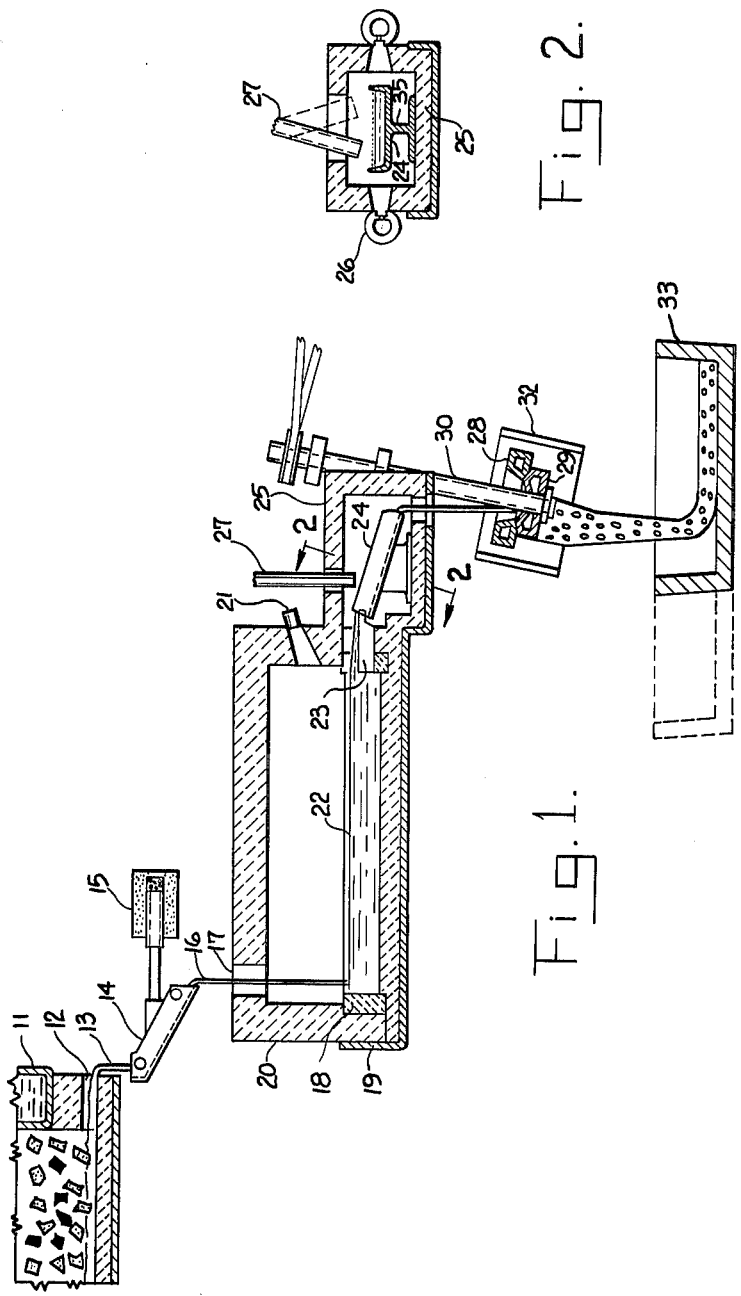
INVENTOR.
EDWARD R. POWELL
BY
John A. McKinney
ATTORNEY United States Patent Office 3,235,351
Patented Feb. 15, 1966

3,235,351
APPARATUS FOR MAKING FOAMED
CERAMIC PRODUCTS
Edward R. Powell, North Plainfield, N.J., assignor to Johns-Manville Corporation, New York, N.Y., a corporation of New York
Original application Apr. 7, 1959, Ser. No. 804,776, now Patent No. 3,133,820, dated May 19, 1964. Divided and this application Aug. 12, 1963, Ser. No. 301,569
6 Claims. (Cl. 65—141)

This application is a division of my co-pending application, Serial No. 804,776, filed April 7, 1959, for "Process, Composition and Apparatus for Making Foamed Ceramic Products," issued May 19, 1964, as Patent No. 3,133,820.

This invention relates to apparatus, a process and compositions for making foamed products from silica- and alumina-containing raw materials, and, more particularly, to a process for foaming compositions comprising silica, alumina, magnesia and lime and a gas-liberating inorganic substance.

Expanded or foamed siliceous products have been prepared by several procedures. In one process, clay is expanded in a rotary kiln, producing a foamed product such as cinder blocks having a density within the range from approximately 30 to 100 lbs. per cubic foot, and useful for the formation of load bearing structures. A typical product of this type is sold under the trade name Haydite. In another procedure, slag is mixed with steam to foam it. A product of this type is available under the trade name Waylite, and this product also is useful in the formation of load bearing structures. Cellular products useful as insulation and acoustical materials are prepared from mixes of powdered glass and a foaming agent which are cellulated in a mold.

In accordance with the instant invention, lightweight structures having a relatively low density in the range from about 12 to 30 lbs. per cubic foot are prepared from mixes containing silica, alumina, magnesia, lime and a foaming agent. These are the essential ingredients. A glass-forming material can also optionally be included. The mix is subjected to a temperature at which a gas is liberated by the foaming agent, and under conditions such that the mass can expand, and then hardened to form the final product.

The compositions of the invention should contain from about 38% to 42% silica, from about 16% to about 22% alumina, from about 2% to about 12% magnesia, and from about 20% to about 40% lime. These may be present in the form of mixed silicates, aluminates, and other compounds, in which event the amounts used are calculated to supply these proportions of the oxides named. These proportions are important in obtaining a final product of good strength and cohesiveness. As the foaming agent for this composition there is used from 0.5 to 3% of a granular inorganic compound capable of reacting at the fusion temperature of the mix with one or more of the other components of the mix to liberate a gas. Typical gas-liberating agents are the alkali metal or alkaline earth metal sulfates, nitrates and sulfites, for instance, sodium sulfate, potassium sulfate, sodium nitrate, calcium nitrate, potassium sulfite, lithium sulfate, calcium sulfate, and sodium sulfite. The sulfates liberate $SO_2$ or $SO_3$, the sulfites $SO_2$, and the nitrates $NO_2$.

Such compositions are readily prepared from available materials. One cheap source is the slag formed as a by-product of steel or phosphate manufacture. These slags normally contain a lower proportion of silica and alumina than is desired in the foamed products of the invention, and the proportions of these materials, therefore, should be increased by combining therewith an inexpensive source of these chemicals, such as shale which supplies both silica and alumina, gravel which supplies silica, or some like natural product. It is also possible to form the raw compositions of the invention by direct blending of the chemicals which are required, that is, silica, alumina, magnesia and lime, but this is more expensive, and usually not as desirable.

The composition is prepared by mixing the ingredients at a temperature above the point of fusion thereof, but generally not in excess of about 30° F. above the point of fusion, so as to avoid undue delay and possible deterioration of the foam before setting to the hardened product. Usually, temperatures above about 2000° F. are satisfactory.

The foaming agent will react rapidly with the other ingredients if it is in a state of fine subdivision so as to provide a large surface area for the reaction. Therefore, it is desirable first to form a flowable melt of the silica, alumina, magnesia and lime, and then incorporate the foaming agent in the form of granules of the order of 6 to 60 mesh, preferably from 6 to 30 mesh, in size, with the other ingredients by adding them to a flowing stream of these ingredients. The mass is intimately and rapidly mixed, and finally deposited into molds and hardened to form the cellular product. The particles of foaming agent can be aggregated if necessary so as to form the granules.

A foamed composition composed solely of the slag or materials composing it and foaming agent will have predominately interconnecting cells. A cellular material in which the cells are not interconnecting can be formed by combining with the mass from about 1.5 to about 6% of a glassforming inorganic substance. Usually, the glass former will be in the proportion within the stated range and at least twice the amount of the foaming agent in the mass. This substance should have a continuous phase from liquid to solid so that it will stretch when solidifying, and it should also have a fusion temperature which is below the fusion temperature of the mass. Typical materials in this group are borax, sodium silicate and glass-forming frits such as sodium borosilicate and lead borosilicate.

FIG. 1 is a diagrammatic view in elevation of a preferred form of apparatus, the parts being shown in central section; and FIG. 2 is a sectional view of part of the apparatus of FIG. 1, taken along the lines 2—2 of FIG. 1.

In FIG. 1, 11 represents part of a cupola type furnace for melting together the starting raw materials, such as slag, and slate and/or gravel. This furnace is conventional in design, and therefore is not shown completely. The cupola has an outlet 12 through which the slag and other material melted therein flows in a stream 13. The stream falls on an inclined water-cooled trough which has a smooth interior surface. This trough is held at a temperature approximating room temperature. The slag solidifies at about 1350° F., and since it is quickly cooled as it hits the trough, it continuously forms a skull on the cold surface. A vibrator 15 keeps the skull moving by vibrating the trough. The vibrator may be a commercial bin vibrator.

The composition stream of liquid slag and skull flows into a forehearth type furnace provided with insulating refractory walls 20, a hard refractory wall 18, and a steel shell 19. The forehearth is fired by a burner 21 so aimed that the pool of liquid slag 22 therein is kept clear of floating coke which may have entered with the slag. In this way, a clarified stream is caused to flow out from the forehearth in an even sheet over the hard refractory block 23 forming a weir at its outlet.

The forehearth equalizes the temperature in the stream 16, and remelts the continuous skull. In this way it acts as an equalizing as well as a clarifying zone. The temperature of the stream 13 is unavoidably much above the liquidus, and this is brought down by the water-cooled trough 14. The trough makes it possible to reduce the temperature of the melt very quickly, so that no time is lost in this step.

The forehearth is provided with the refractory block 23 forming a weir at its outlet to restrain and separate out solidified and foreign materials such as entrained metal which is usually present due to the reduction of iron present in the slag and rock by the coke in the cupola. It is necessary to use metal parts for subsequent steps in the process, and these can be used at a much higher temperature if free iron is not present, since at these temperatures free iron may alloy with the apparatus.

The molten slag leaving the forehearth furnace flows in a sheet over a tapered trough 24. The trough is so mounted that its edge temperature can be maintained against radiation by a pair of strip or ribbon burners 26, best shown in FIG. 2. The trough is carried by a centrally mounted web 35, which is heat-conducting and serves to carry heat away from the central portion of the trough. Thus, the sheet of molten slag flowing down the trough is heated at its edges and cooled at its central portion. The trough is enclosed by insulating refractory 25 so that it may be maintained at about 2100° F., the highest temperature at which most base metal alloys can be exposed to air.

The foaming agent in granular form is added to the slag through an oscillating pipe 27 as it flows over the trough surface. The pipe 27 is preferably water-cooled to prevent overheating, and a flow of a mixture of air and combustible gas also is provided through the pipe to prevent condensation. The foaming agent granules stick to the slag surface as they are deposited on it through the pipe, and melt as they flow along with the sheet of slag. They form streaks, so that the sheet is not a true mixture but merely a composite of different composition from portion to portion of its surface.

The composite sheet flows from trough 24 by gravity to a high speed mixer composed of a stator 28 and a rotor 29 mounted on a shaft 30. The rotor abuts closely against the surface of the stator and is adapted to be driven at a variable speed. The stator is mounted on a slide (not shown) and is adapted to be spring- or weight-loaded. By adjusting the load and the speed a thin film of melt is forced by centrifugal force between the stator and rotor, which effects instantaneous and thorough mixing of the composite mass of slag and foaming agent. The rotor is, for example, driven at 2000 r.p.m., and requires 10 H.P. for a ton an hour production. Both the stator and rotor are provided with cored openings for steam cooling, so that their temperature can be controlled within the working limits of the metal without solidifying the slag.

The intimately mixed mass is conducted from the mixer into a moving mold 33. Because of the high temperature of the mass, the foaming agent liberates gas during the mixing, and the density of the mass is greatly decreased so that it will no longer flow readily. In most cases, the density of the mass emerging from the mixer is one-tenth that of the mass entering the mixer. Hence, the mold must be carefully placed below the mixer, so that the froth will fall in all parts of it and can be leveled off before it sets. It can then be annealed and trimmed to size. A rounded aggregate can be prepared by depositing the froth onto a rapidly moving conveyer, forming small granules which then harden in the form of light pebbles.

The foaming as has been stated takes place during the mixing and thereafter. In order to obtain the desired degree of expansion of the mass, the temperature and the time during which the mass is exposed to this temperature in the mixing zone must be carefully controlled. The foaming agent should be molten by the time the sheet of slag and foaming agent reaches the mixer. If it is not, there will be little foaming during the mixing. If the foaming agent reaches the temperature of the slag before thorough mixing therewith, a large part of the gas liberated will be wasted, since the gas-liberating reaction is very rapid. It is also necessary that the rate of flow of the slag sheet be carefully adjusted, so that the foaming agent does not liberate a significant quantity of gas until after it has been thoroughly mixed with the mass.

Better control of the foaming is obtained if the foaming agent is in the form of granules ranging from 6 to 60 mesh in size, preferably from 6 to 30 mesh. The foaming agent can be granulated by dry mixing it in a chaser or ball mill, moistening it slightly and putting the material through a pair of heavy rolls set to 0.030 or 0.040 inch part under load. The cake obtained after drying is put through a rubber and steel roll combination to crack it up into granules. The desired fraction is screened out. The oversize is recrushed and the fines are mixed and rolled again.

If a glass-forming material is to be incorporated, this is mixed with the foaming agent before granulating.

The following examples represent in the opinion of the inventor the preferred embodiments of his invention.

*Example 1*

A slag from steel manufacture was blended with shale to form a mix containing 42% silica, 18% alumina, 4% trace elements including manganese, titanium and sulfur, 6% magnesia and 30% lime. The mix was fused in a furnace of the type shown in FIG. 1 at an average temperature of approximately 2650° F., and then cooled quickly to 2450° F. by flowing it through the trough 14. It was then re-fused in the forehearth furnace, equalized to a temperature of approximately 2450° F., and flowed into the trough 24 in the form of a thin sheet. Sodium sulfate was added continuously through the pipe 27 in the proportion of approximately 1% by weight of the slag composition. The sheet was flowed into the mixer and thence into mold 33. Only a few seconds elapsed between the time of combining the foaming agent with the slag and the time of emergence of the poured mass from the mixer. The foamed mass was allowed to harden by permitting it to cool to room temperature. The final product had a density of approximately 18 pounds per cubic foot, and was suitable for use as panel wall building material or acoustical material.

*Example 2*

A cellular material was prepared according to the process of Example 1, incorporating 2% sodium silicate with the sodium sulfate. The product obtained had a vesicular structure, and a density of approximately 15 pounds per cubic foot, and was useful for refrigeration and perimeter insulation and the like.

*Example 3*

Example 1 was repeated, substituting 2% sodium nitrate for the sodium sulfate. A panel wall insulating material was obtained, having a density of approximately 20 pounds per cubic foot.

*Example 4*

Example 2 was repeated, employing 2% borax in place of the sodium sulfate. The product obtained had a density of approximately 20 pounds per cubic foot, and was useful for panel wall material having insulating value.

I claim:

1. Apparatus for forming foamed ceramic products, comprising, in combination, a furnace for melting together foam-producing raw materials, a water-cooled trough positioned adjacent to the said furnace to receive a stream of molten material from the furnace and to cool said stream, a forehearth positioned adjacent to the said water-cooled trough to receive the cooled stream from the trough and having a burner to re-fuse the cooled stream and a weir at its outlet to clarify the melt and separate any entrained metal therefrom, a trough positioned adjacent to the said forehearth outlet and provided with heater means at its edges and cooling means at its central portion to receive and heat melt from the forehearth, means positioned above the said second mentioned trough to add foaming agent to the melt passing through the second-mentioned trough, a mixer positioned adjacent to the said second-mentioned trough outlet to receive and mix melt flowing from the second-mentioned trough, and means positioned beneath the said mixer to collect the mixed and foamed melt emerging from the mixer.

2. Apparatus in accordance with claim 1, in which the mixer comprises a stator and rotor in juxtaposition and adapted to be driven at variable speeds, and force the melt between the stator and rotor to effect the mixing.

3. Apparatus for forming foamed ceramic products, comprising, in combination, a furnace for melting together foam-producing raw materials, a water-cooled trough positioned adjacent to the said furnace to collect the discharge therefrom and cool the same, vibratory means secured to said trough to induce continuous movement of said stream, a forehearth positioned adjacent to the said water-cooled trough to receive the stream therefrom and to re-fuse a fraction of said stream, a trough positioned adjacent to the outlet of the said forehearth and provided with devices for maintaining even lateral temperature, a mixer positioned to receive and mix the stream from the second-mentioned trough, the mixer adapted to be driven at high speed and controlled for power load, and moving means located beneath the mixer for distributing and receiving the foamed melt.

4. Apparatus for producing foamed slag comprising, in combination with a furnace, a trough to receive molten slag and to cool and to convey the cooled slag, a forehearth furnace positioned adjacent to the said trough to receive the cooled slag and to reheat the same, a temperature equalizing trough positioned adjacent to the forehearth furnace outlet provided with heating means at its outer edges and centrally positioned heat conducting means for conveying molten slag from the furnace, means positioned above the said second-mentioned temperature equalizing trough for distributing granular foaming agent over the surface of the molten slag while passing through said temperature equalizing trough, and a mixer positioned to receive and mix the molten slag and foaming agent.

5. Apparatus for producing foamed slag comprising, in combination, a water-cooled trough, a forehearth furnace, said water-cooled trough extending to an inlet of the forehearth furnace, a second trough provided with burners heating its outer edges and a heat conducting centrally located web positioned to receive molten slag discharged from the furnace, means for distributing granular foaming agent over the molten slag within the last-mentioned trough, a mixer comprising a stator and rotor positioned to receive the molten slag and foaming agent from the last-mentioned trough.

6. Apparatus for producing foamed slag comprising, in combination, an inclined water-cooled trough provided with vibrating means and leading to a forehearth furnace for cooling molten slag and conveying the cooled slag to the furnace, a forehearth furnace having a refractory block forming a weir at its outlet to restrain solidified and foreign materials, a second trough positioned to receive molten slag discharged over the refractory block weir of the forehearth furnace having burners heating its outer edges and a heat conducting centrally mounted web whereby the flowing stream of material within the trough is maintained at a substantially uniform temperature across the trough, means for distributing granular foaming agent over the surface of the flowing molten slag within the last-mentioned trough, and a high speed mixer comprising a stator and rotor positioned to receive the molten slag and foaming agent from the said last-mentioned trough and mix the same.

References Cited by the Examiner

UNITED STATES PATENTS

| | | | |
|---|---|---|---|
| 2,044,450 | 6/1936 | Schol | 65—141 |
| 2,772,517 | 12/1956 | Bowes | 65—258 |

FOREIGN PATENTS

| | | |
|---|---|---|
| 143,500 | 4/1921 | Great Britain. |

DONALL H. SYLVESTER, *Primary Examiner.*